(12) United States Patent
Srinivasan et al.

(10) Patent No.: US 9,201,500 B2
(45) Date of Patent: Dec. 1, 2015

(54) MULTI-MODAL TOUCH SCREEN EMULATOR

(71) Applicant: Intel Corporation, Santa Clara, CA (US)

(72) Inventors: Sadagopan Srinivasan, Hillsboro, OR (US); Rameshkumar Illikkal, Portland, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/631,309

(22) Filed: Sep. 28, 2012

(65) Prior Publication Data

US 2014/0092014 A1    Apr. 3, 2014

(51) Int. Cl.
*G09G 5/00* (2006.01)
*G06F 3/01* (2006.01)
*G06F 3/03* (2006.01)

(52) U.S. Cl.
CPC .............. *G06F 3/013* (2013.01); *G06F 3/017* (2013.01); *G06F 3/0304* (2013.01)

(58) Field of Classification Search
CPC ............ G06F 3/01; G06F 3/013; G06F 3/017
USPC ................... 345/156–158, 173; 715/781, 863
See application file for complete search history.

(56) References Cited

U.S. PATENT DOCUMENTS

| | | | |
|---|---|---|---|
| 6,111,580 A | 8/2000 | Kazama et al. | |
| 8,094,122 B2 * | 1/2012 | Molander et al. | 345/157 |
| 2009/0077504 A1 | 3/2009 | Bell et al. | |
| 2010/0007601 A1 | 1/2010 | Lashina et al. | |
| 2011/0262002 A1 | 10/2011 | Lee | |
| 2011/0289456 A1 | 11/2011 | Reville et al. | |
| 2012/0257035 A1 * | 10/2012 | Larsen | 348/78 |
| 2013/0154913 A1 * | 6/2013 | Genc et al. | 345/156 |
| 2013/0169560 A1 * | 7/2013 | Cederlund et al. | 345/173 |
| 2013/0307771 A1 * | 11/2013 | Parker et al. | 345/158 |

OTHER PUBLICATIONS

International Search Report and Written Opinion dated Dec. 27, 2013 for International Patent Application No. PCT/US2013/059870.

* cited by examiner

*Primary Examiner* — Jennifer Nguyen
(74) *Attorney, Agent, or Firm* — Jordan IP Law, LLC (57) ABSTRACT

Systems and methods may provide for capturing a user input by emulating a touch screen mechanism. In one example, the method may include identifying a point of interest on a front facing display of the device based on gaze information associated with a user of the device, identifying a hand action based on gesture information associated with the user of the device, and initiating a device action with respect to the front facing display based on the point of interest and the hand action.

23 Claims, 2 Drawing Sheets

MULTI-MODAL TOUCH SCREEN EMULATOR

BACKGROUND

1. Technical Field

Embodiments generally relate to user input capture. More particularly, embodiments relate to capturing user input by emulating a touch screen interface.

2. Discussion

A touch screen interface may allow a user to touch a device surface (e.g., a device display) to facilitate user input. Many modern consumer electronic devices (e.g., tablets, smartphones, etc.) may utilize touch screen interfaces. Unfortunately, touch screen interfaces may typically increase production costs of these devices significantly. Indeed, in some cases, 30-40% of the cost of a touch screen-enabled device can be related to the cost of the touch screen interface.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
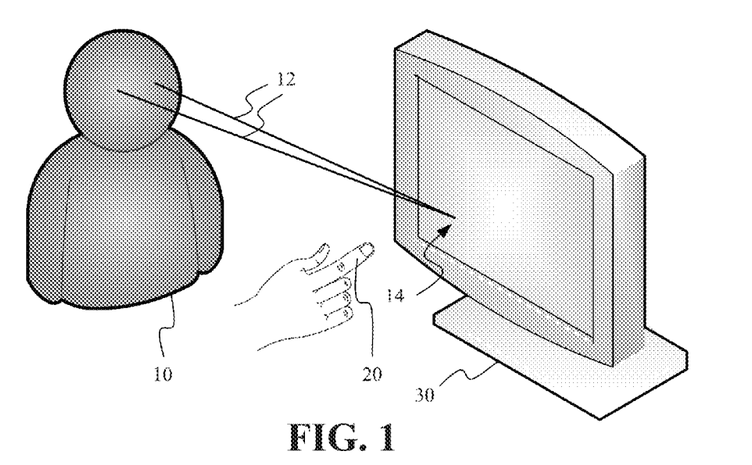
FIG. 1 is an illustration of an example of a user's interaction with a multi-modal touch screen emulator according to an embodiment.

Embodiments may generally relate to capturing a user input by emulating a touch screen mechanism. FIG. 1 is an illustration of an example of an interaction of a user 10 with a computer system 30 including multi-modal touch screen (MMTS) emulator according to an embodiment. In embodiments of the present invention, the MMTS emulator may utilize, among other things, gaze tracking and gesture tracking to emulate a touch-screen interface.

The MMTS emulator may utilize gaze tracking to determine where the attention of the user 10 is directed. In particular, the MMTS emulator may determine a location of a point of interest 14 (e.g., on a display screen/device) by identifying one or more of the eyes of the user 10, and tracking a gaze 12 of the one more eyes to the location of the point of interest 14.

In one example, the MMTS emulator may utilize precision tracking to track an iris of the user 10. So, if the attention of the user 10 is directed, for example, to a particular icon located on the display screen of the computer system 30, the MMTS emulator may be configured track the gaze 12 by focusing on the iris, and determine the particular icon on which the user 10 is focused. The gaze tracking aspect of the MMTS emulator may, for example, be activated upon detection of a human presence (e.g., detection of a human head or face) in a captured image, or may operate continuously (i.e., as long as a coupled camera is powered on).

Second, the MMTS emulator may utilize gesture tracking to determine what the user 10 is intending to do. That is, the MMTS emulator may analyze the body movements of the user 10 to recognize an input-related gesture, and classify the gesture as a particular device action that the user 10 is requesting. So, in one example, the MMTS emulator may be configured to identify one or more fingertips of a user, such as a fingertip 20, and analyze the movements of the one or more fingertips to identify input-related gestures. In other examples, the MMTS emulator may focus on another body part of the user (e.g., a finger, a hand, an arm, etc.), or on an input appendage (e.g., an input device extending from the user) operated by the user as well.

An MMTS emulator as described may be configured to recognize a number of user gestures. One such gesture that an MMTS emulator may be a single-touch gesture. A single-touch gesture may utilize a single body part (e.g., a single fingertip, a single hand, etc.) to input a device action. One example of a single-touch gesture may be a movement of the user's fingertip from a starting left coordinate to an ending right coordinate. This movement may indicate that the user intends to implement a corresponding left to right movement within the computer interface (e.g., on a display interface). Similarly, the MMTS emulator may be configured to classify, among other things, a move from right to left, a move from top to bottom, a move from bottom to top, diagonal movements, and so forth. In addition, the MMTS emulator may be configured to recognize and classify, for example (and not limited to), a start motion, a stop motion, an open motion, a close motion, an activate motion, or a shut down motion from the user as well.

The MMTS emulator may also be configured to recognize a multi-touch gesture. A multi-touch may utilize more than one body part to input a device action. So, for example, in the case of a "zoom-in" gesture, the MMTS emulator may be configured to recognize that the user is bringing two fingertips together. Alternatively, the MMTS emulator may be configured a "zoom-out" gesture by recognizing that the user is taking two fingertips apart. Similar to the gaze tracking aspect, the gesture tracking aspect of the MMTS emulator may operate continuously (i.e., as long as a coupled camera is powered on), or may be activated upon detection of a human presence (e.g., detection of a human head or face) in a captured image.

Figure 2:
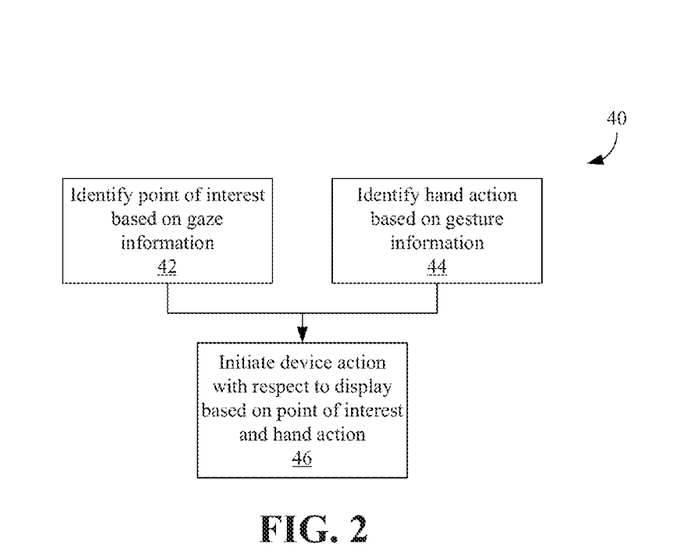
FIG. 2 is a flowchart of an example of a method of utilizing a multi-modal touch screen emulator according to an embodiment.

FIG. 2 is a flowchart of an example of a method 40 of utilizing an MMTS emulator according to an embodiment. The method 40 might be implemented as a set of logic instructions stored in a machine- or computer-readable storage medium such as, for example, random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 4o may be written in any combination of one or more programming languages, including an object oriented programming language such as, for example, Java, Smalltalk, C++ or the like and conventional procedural programming languages, such as the "C" programming language or similar programming languages.

At processing block 42, an MMTS emulator may track information relating to user's gaze to identify a point of interest. In this example, the MMTS emulator may be configured to utilize precision tracking to track the user's iris to an icon displayed on a display screen that the user wants to move from left to right (e.g., drag and drop).

The user's gaze may be focused on a first location on the device display (e.g., with coordinates $(G)x_1, (G)y_1$) where the icon is initially located on the display screen. As the user gestures to indicate the desired move from left to right, the user's gaze will move correspondingly from the first location to a second location on the device display (e.g., with coordinates $(G)x_2, (G)y_2$). The MMTS emulator may timestamp and log this gaze information in a storage device for analysis.

At processing block 44, the MMTS emulator may concurrently track information relating to the user's gestures to identify what the user is intending to do. The tracked movement may be a one-dimensional (1D) movement, a two-dimensional (2D) movement and a three-dimensional (3D) movement, or any combination thereof. So, in this example, the user may indicate a desired movement of the icon by motioning her fingertip toward the display (e.g., icon selection), making a corresponding movement of her fingertip from left to right (e.g., icon drag), and motioning her fingertip away from the display (e.g., icon drop). The MMTS emulator may capture one or more images of the hand of the user and conduct object recognition and/or detection in order to identify the hand and/or fingertip as well as these corresponding hand actions. The MMTS emulator may timestamp and log the hand actions as gesture information in a storage device for analysis.

At processing block 46, the MMTS emulator may synchronize the user's gesture and gaze information to initiate device actions. So, in this example, the MMTS emulator may access the gaze information (i.e., that the user is focused on a particular icon, and that the user's focus has moved from the first coordinate $(G)x_1, (G)y_1$ to the second coordinate $(G)x_2, (G)y_2$)) and synchronize it with the gesture information (e.g., hand actions). The MMTS emulator may synchronize these two pieces of information to determine that the icon should be selected (e.g., due to detected motion of fingertip toward display while the gaze is at $(G)x_1, (G)y_1$), moved from a first location on the display screen to a second location on the display screen (e.g., due to detected movement of fingertip from left to right), and released (due to detected motion of fingertip away from display while the gaze is at $(G)x_2, (G)y_2$). Accordingly, the MMTS emulator may emulate a touchscreen interface. Upon synchronizing these two types of information to determine the requested device action, the MMTS emulator may transmit a control signal to move the icon in a corresponding manner on the display screen.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment described above, the MMTS emulator may concurrently track a user's gesture and gaze information. However, this need not necessarily be the case. In another exemplary embodiment, the MMTS emulator may be configured to utilize the gesture information to "filter" the incoming eye information. That is, for example, an MMTS emulator may be configured to not act upon the incoming eye information until a gesture has been recognized. After a gesture is recognized, an MMTS emulator (e.g., via an integration module) may then synchronize the incoming gaze and gesture information, determine the action to be taken, and transmit a control signal to effect the action.

Also, in another exemplary embodiment, the MMTS emulator may utilize the gaze information to verify the gesture information. So, for example, upon recognizing and classifying a user gesture, the MMTS emulator may also verify the gesture before acting by ensuring that the user's gaze was focused on relevant portion of the display screen. In another example, the MMTS emulator may verify the gesture before acting by verifying that the distance of the body of the user was within a predefined or relevant distance.

Figure 3:
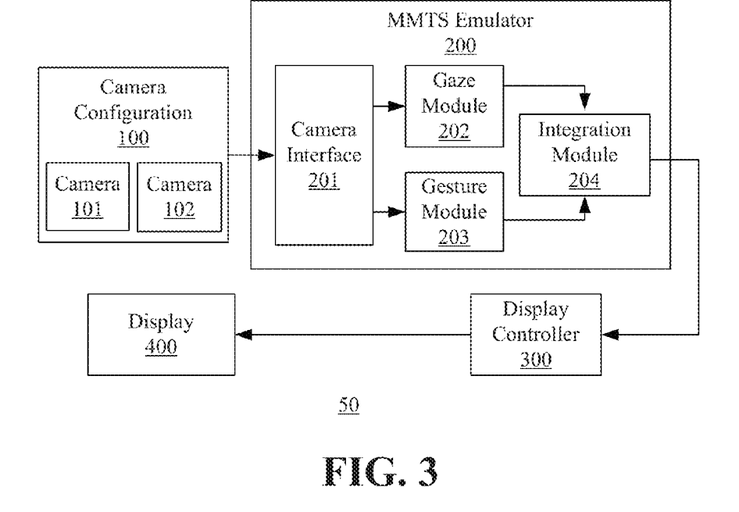
FIG. 3 is a block diagram of an example of a multi-modal touch screen emulator according to an embodiment.

FIG. 3 is a block diagram of an example of a device 50 according to an embodiment. In this example, the device 50 may include a camera configuration 100, an MMTS emulator 200, a display controller 300, and a display device 400.

The camera configuration 100 may include any device configured to capture an image and/or a video feed of an object or image. So, in this example, the camera configuration 100 may include a first camera 101 for gesture tracking and a second camera 102 for gaze tracking. The first camera 101 and the second camera 102 may be positioned and calibrated according to a relevant field of vision. For example, the first camera 101 may be positioned to have a broad field of vision configured to include nearly the entire body of the user, and may be further calibrated to focus on the upper body of the user. On the other hand, the second camera 102 may be positioned to have a narrow field of vision configured to focus on the user's head, and may be further calibrated to focus on the user's eyes. The positioning and calibration of the camera configuration 100 may be done manually or automatically (i.e., via a software application).

As discussed above, the MMTS emulator 200 may be directed to, among other things, receiving gaze and gesture information from the camera configuration 100, analyzing this information to determine a device action requested by a user, and initiating the device action. The MMTS emulator 200 may include a camera interface 201, a gaze module 202 (e.g., gaze accelerator), a gesture module 203 (e.g., gaze accelerator), and an integration module 204.

The camera interface 201 may enable the MMTS emulator 200 to communicate with the camera configuration 100. Specifically, the camera interface 201 may receive video data (including a user's gaze and gesture information) being sent from the camera configuration 100, and relay the video data to other components of the MMTS emulator 200 for analysis.

The gaze module 202 may be configured to receive, store, and analyze the user's gaze information to determine where the user's attention is directed. For example, as discussed above, the gaze module 202 may determine the location of the user's gaze, and map the location of the user's gaze to a particular location on a display screen.

The gesture module 203 may be configured to receive, store, and analyze the user's gesture information to determine what the user is intending to do. For example, as discussed above, the gesture module 203 may recognize a user's gesture by tracking the user's body movements (e.g., fingertip movements), and classify the body movement as a gesture and/or hand action.

The integration module 204 may receive the user's gaze information from the gaze module 202 and the user's gesture information from the gesture module 203 to initiate a device action and emulate a touchscreen interface (as discussed above). So, for example, the integration module 204 may synchronize the incoming gesture information and the gaze information to determine that the user is requesting that a particular icon be moved from a first location to a second location.

In this embodiments of the present invention, the MMTS emulator 200 may be at least one of a hardware component such as a circuit element (e.g., including transistors, resistors, capacitors, inductors, and so forth), an integrated circuit, application specific integrated circuit (ASIC), programmable logic device (PLD), digital signal processors (DSP), field programmable gate array (FPGA), logic gates, a firmware component, a register, semiconductor device, chips, microchips, chip sets, and so forth. Also, in other embodiments, the MMTS emulator 200 may be implemented via a software application as well. In this embodiment, the MMTS emulator 200 may include a device driver located in an input/output module. For example, the integration module 204 may use a mouse device driver to issue device actions according to the aforementioned gaze information and gesture information.

The display device 400 may be an output device that presents electronic information in visual form. The display controller 300 may be a controller that interfaces with the display device 400. So, for example, the display controller 300 may receive a control signal from the integration module 204, and effect a corresponding device action displayed on the display device 400.

The sequence and numbering of blocks depicted in FIG. 3 is not intended to imply an order of operations to the exclusion of other possibilities. Those of skill in the art will appreciate that the foregoing systems and methods are susceptible of various modifications, variations, and alterations. For example, in the embodiment described above, the MMTS emulator 200 may be coupled to the display controller 300, which may be coupled to a display 400. The MMTS emulator 200 may send a control signal to effect a device action on the display 400. However, this need not necessarily be the case. In another example, an MMTS emulator may be coupled to a different device by a different device controller. For example, an MMTS emulator may be coupled to an input/output (I/O) device controller (e.g., a mouse controller), which may be coupled to an I/O device (e.g., a mouse).

Figure 4:
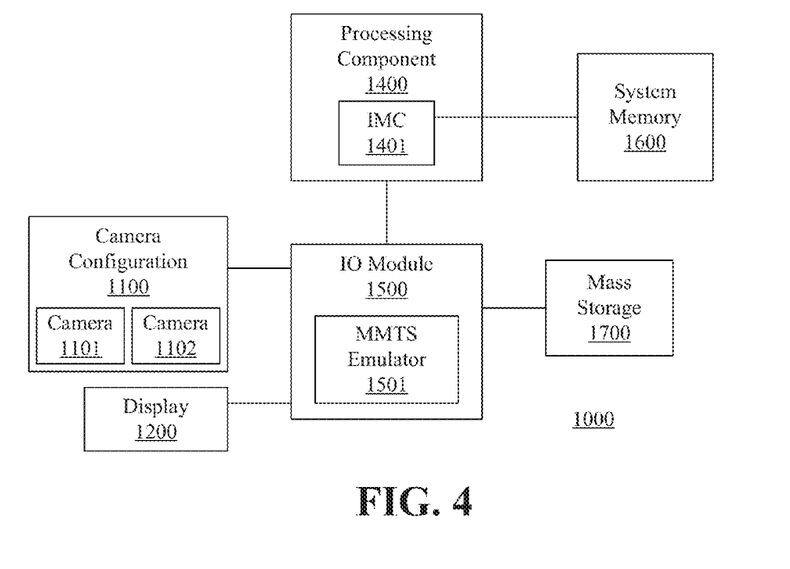
FIG. 4 is a block diagram of an example of a system including a multi-modal touch screen emulator according to an embodiment.

FIG. 4 is a block diagram of an example of a system 1000 including an MMTS emulator 1501 according to an embodiment. Examples of the system 1000 may include a laptop, desktop, personal digital assistant (PDA), media player, mobile Internet device (MID), any smart device such as a smart phone, smart tablet, smart TV, or the like. In this example, the system 1000 may be a smart phone. The illustrated system 1000 includes a camera configuration 1100, a display device 1200, an I/O module 1500, a processing component 1400, a system memory 1600, and mass storage 1700.

Similar to the camera configuration 100 (FIG. 3), The camera configuration 1100 may include any device configured to capture an image or a video feed of an object or image. In this example, the camera configuration 100 may include a first camera 1101 and a second camera 1102. The first camera 1101 may, for example, be used for gesture tracking, while the second camera 1102 may be used for gaze tracking.

The display device 400 may be an output device presents electronic information in visual form. For example, video captured from the camera configuration 1100 may be displayed on the display device 1200 for viewing.

The processing component 1400 may include at least one computer processor that may be utilized to execute computer-readable executable instructions. The processor may include an integrated memory controller (IMC) 1401. The processor 1400 may communicate with the system memory 1600 via the IMC 1401.

The I/O module 1500 may be used to facilitate inputs (e.g., user inputs) and outputs (e.g., display instructions) for the system 1000. The I/O module may include an MMTS emulator 1501, similar to the MMTS emulator 200 (FIG. 3), already discussed.

The system memory 1600 and the mass storage 1700 may be any component or device capable of storing data. In this example, the system memory 1600 may be configured to store, among other things, information relating to the operation of the system 1000. The mass storage 1700 may be used to store, for example, personal information of a user.

The sequence and numbering of blocks depicted in FIG. 4 is not intended to imply an order of operations to the exclusion of other possibilities. Those of skill in the art will appreciate that the foregoing systems and methods are susceptible of various modifications, variations, and alterations.

For example, in the embodiment described above, the camera configuration 1100 may include a first camera 1101 and a second camera 1102. However, this need not necessarily be the case. An embodiment may include any number of cameras. So, for example, in another exemplary embodiment, a camera configuration may include one camera. This camera may be positioned and calibrated to capture both a user's gaze and gesture information.

Embodiments may therefore provide for a method comprising receiving a first image from a first front facing camera of a device having a front facing display, identifying one or more eyes of a user of the device based on the first image, and determining a gaze location of the one or more eyes on the front facing display. The method may also provide determining a change in the gaze location, receiving a second image from a second front facing camera of the device, identifying a point of interest on the front facing display based on gaze information, wherein the gaze information includes the gaze location and the change in the gaze location, and identifying a hand of the user based on the second image. The method may also include identifying one or more fingertips associated with the hand of the user based on the second image and determining a movement of one or more of the hand and the one or more fingertips. Furthermore, the method may include identifying a hand action based on gesture information, wherein the gesture information is to include the movement and the movement is one or more of a 1D movement, a 2D movement and a 3D movement and initiating a device action with respect to the front facing display based on the point of interest and the hand action.

In one example, the method may include classifying the movement as the device action, wherein the device action includes one or more of a single click operation, a double click operation, a pinch operation and a cursor movement operation.

In another example, initiating the device action includes sending a request to a device driver, wherein the device driver includes one or more of a mouse driver, a touchpad driver and a trackball driver.

In yet another example, the method may include synchronizing the gaze information with the gesture information and logging one or more of the gaze information and the gesture information.

Embodiments may also include a computer readable storage medium comprising a set of instructions which, if executed by a processor, cause a device to identify a point of interest on a front facing display of the device based on gaze information associated with a user of the device. The set of instructions may also cause a device to identify a hand action based on gesture information associated with the user of the device and initiate a device action with respect to the front facing display based on the point of interest and the hand action.

In one example, the instructions, if executed, cause the device to receive image data from a front facing camera configuration of the device and identify the gaze information and the gesture information based on the image data.

In another example, the instructions, if executed, cause the device to receive a first image from a first camera of the camera configuration and receive a second image from a second camera of the camera configuration, wherein the image data is to include the first image and the second image, the gaze information is to be determined based on the first image, and the gesture information is to be determined based on the second image.

In still another example, the instructions, if executed, cause the device to identify one or more eyes of the user, determine a gaze location of the one or more eyes on the front facing display, and determine a change in the gaze location, wherein the gaze information is to include the gaze location and the change in the gaze location.

In yet another example, the instructions, if executed, cause the device to identify a hand of the user, identify one or more fingertips associated with the hand of the user, and determine a movement of one or more of the hand and the one or more fingertips, wherein the gesture information is to include the movement and the movement is to be one or more of a 1D movement, a 2D movement and a 3D movement.

In one example, the instructions, if executed, cause the device to classify the movement as the device action, wherein the device action is to include one or more of a single click operation, a double click operation, a pinch operation and a cursor movement operation.

In another example, the instructions, if executed, cause the device to send a request to a device driver to initiate the device action, wherein the device driver is to include one or more of a mouse driver, a touchpad driver and a trackball driver.

In still another example, the instructions, if executed, cause the device to synchronize the gaze information with the gesture information and log one or more of the gaze information and the gesture information.

Still another embodiment may provide for an apparatus comprising a gaze module to identify a point of interest on a front facing display of a device based on gaze information associated with a user of the device, a gesture module to identify a hand action based on gesture information associated with the user of the device, and an integration module to initiate a device action with respect to the front facing display based on the point of interest and the hand action.

In one example, the apparatus may include a camera interface to receive image data from a front facing camera configuration of the device, wherein the gaze module is to identify the gaze information based on the image data and the gesture module is to identify the gesture information based on the image data.

In one example, the camera interface is to receive a first image from a first camera of the camera configuration, and receive a second image from a second camera of the camera configuration, wherein the image data is to include the first image and the second image, the gaze module is to determine the gaze information based on the first image, and the gesture module is to determine the gesture information based on the second image.

In one example, the gaze module is to identify one or more eyes of the user, determine a gaze location of the one or more eyes on the front facing display, and determine a change in the gaze location, wherein the gaze information is to include the gaze location and the change in the gaze location.

In another example, the gesture module is to identify a hand of the user, identify one or more fingertips associated with the hand of the user, and determine a movement of one or more of the hand and the one or more fingertips, wherein the gesture information is to include the movement and the movement is to be one or more of a 1D movement, a 2D movement and a 3D movement.

In still another example, the integration module is to classify the movement as the device action, wherein the device action is to include one or more of a single click operation, a double click operation, a pinch operation and a cursor movement operation.

In yet another example, the integration module is to send a request to a device driver to initiate the device action, wherein the device driver is to include one or more of a mouse driver, a touchpad driver and a trackball driver.

In one example, the integration module is to synchronize the gaze information with the gesture information, and log one or more of the gaze information and the gesture information.

Another embodiment may provide for a device comprising a front facing display and a touch screen emulator. The touch screen emulator may include a gaze module to identify a point of interest on the front facing display based on gaze information associated with a user of the device, a gesture module to identify a hand action based on gesture information associated with a user of the device, and an integration module to initiate a device action with respect to the front facing display based on the point of interest and the hand action.

In one example, the device may include a front facing camera configuration, wherein the touch screen emulator further includes a camera interface to receive image data from the front facing camera configuration, the gaze module is to identify the gaze information based on the image data, and the gesture module is to identify the gesture information based on the image data.

In another example, the camera configuration includes a first camera and a second camera, and wherein the camera interface is to receive a first image from the first camera of the camera configuration. The camera interface is also to receive a second image from the second camera of the camera configuration, wherein the image data is to include the first image and the second image, the gaze module is to determine the gaze information based on the first image, and the gesture module is to determine the gesture information based on the second image.

In one example, the gaze module is to identify one or more eyes of the user, determine a gaze location of the one or more eyes on the front facing display, and determine a change in the gaze location, wherein the gaze information is to include the gaze location and the change in the gaze location.

In another example, the gesture module of the device is to identify a hand of the user, identify one or more fingertips associated with the hand of the user, and determine a movement of one or more of the hand and the one or more fingertips, wherein the gesture information is to include the movement and the movement is to be one or more of a 1D movement, a 2D movement and a 3D movement.

In still another example, the integration module of the device is to classify the movement as the device action, wherein the device action is to include one or more of a single click operation, a double click operation, a pinch operation and a cursor movement operation.

In one example, the integration module of the device is to send a request to a device driver to initiate the device action, wherein the device driver is to include one or more of a mouse driver, a touchpad driver and a trackball driver.

In still another example, the integration module of the device is to synchronize the gaze information with the gesture information and log one or more of the gaze information and the gesture information.

Another embodiment may therefore provide for a method including identifying a point of interest on a front facing display of the device based on gaze information associated with a user of the device and identifying a hand action based on gesture information associated with the user of the device. The method may also include initiating a device action with respect to the front facing display based on the point of interest and the hand action.

In one example, the method includes receiving image data from a front facing camera configuration of the device and identifying the gaze information and the gesture information based on the image data.

In another example, the method includes receiving a first image from a first camera of the camera configuration and receiving a second image from a second camera of the camera configuration. The image data is to include the first image and the second image, the gaze information is to be determined based on the first image, and the gesture information is to be determined based on the second image.

In still another example, the method includes identifying one or more eyes of the user, determining a gaze location of the one or more eyes on the front facing display, and determining a change in the gaze location, wherein the gaze information is to include the gaze location and the change in the gaze location.

In yet another example the method includes identifying a hand of the user, identifying one or more fingertips associated with the hand of the user; and determining a movement of one or more of the hand and the one or more fingertips. In this example, the gesture information is to include the movement and the movement is to be one or more of a one-dimensional (1D) movement, a two-dimensional (2D) movement and a three-dimensional (3D) movement.

In another example, the method includes classifying the movement as the device action, wherein the device action is to include one or more of a single click operation, a double click operation, a pinch operation and a cursor movement operation.

In one example, the method includes sending a request to a device driver to initiate the device action, wherein the device driver is to include one or more of a mouse driver, a touchpad driver and a trackball driver.

In another example, the method includes synchronizing the gaze information with the gesture information and logging one or more of the gaze information and the gesture information.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   receiving a first image from a first front facing camera of a device having a front facing display;
   identifying one or more eyes of a user of the device based on the first image;
   determining a gaze location of the one or more eyes on the front facing display;
   determining a change in the gaze location;
   receiving a second image from a second front facing camera of the device;
   identifying a point of interest on the front facing display based on gaze information, wherein the gaze information includes the gaze location and the change in the gaze location;
   identifying a hand of the user based on the second image;
   identifying one or more fingertips associated with the hand of the user based on the second image;
   determining a movement of one or more of the hand and the one or more fingertips;
   identifying a hand action based on gesture information, wherein the gesture information is to include the movement and the movement is one or more of a one-dimensional (1D) movement, a two-dimensional (2D) movement and a three-dimensional (3D) movement; and
   initiating a device action with respect to the front facing display based on the point of interest and the hand action, wherein the device action is to emulate a multi-modal touchscreen function with respect to the front facing display that concurrently tracks and synchronizes the gaze information and the gesture information.

2. The method of claim 1, further including classifying the movement as the device action, wherein the device action includes one or more of a single click operation, a double click operation, a pinch operation and a cursor movement operation.

3. The method of claim 1, wherein initiating the device action includes sending a request to a device driver, wherein the device driver includes one or more of a mouse driver, a touchpad driver and a trackball driver.

4. The method of claim 1, further including:
   synchronizing the gaze information with the gesture information; and
   logging one or more of the gaze information and the gesture information.

5. A computer readable storage medium comprising a set of instructions which, if executed by a processor, cause a device to:
   identify one or more eyes of a user of a device having a front facing display;
   determine a gaze location of the one or more eyes on the front facing display;
   identify a point of interest on the front facing display based on gaze information associated with the user of the device;
   determine a change in the gaze location, wherein the gaze information is to include the gaze location and a change in the gaze location;
   identify a hand action based on gesture information associated with the user of the device;
   initiate a device action with respect to the front facing display based on the point of interest and the hand action, wherein the device action is to emulate a multi-modal touchscreen function with respect to the front facing display based on the first image and the second image, and wherein the multi-modal touchscreen function is to concurrently track and synchronize the gaze information and the gesture information;
   receive image data from a front facing camera configuration of the device;
   identify the gaze information and the gesture information based on the image data;
   receive a first image from a first camera of the camera configuration; and
   receive a second image from a second camera of the camera configuration, wherein the image data is to include the first image and the second image, the gaze information is to be determined based on the first image, and the gesture information is to be determined based on the second image.

6. The medium of claim 5, wherein the instructions, if executed, cause the device to:
   identify a hand of the user;
   identify one or more fingertips associated with the hand of the user; and
   determine a movement of one or more of the hand and the one or more fingertips, wherein the gesture information is to include the movement and the movement is to be one or more of a one-dimensional (1D) movement, a two-dimensional (2D) movement and a three-dimensional (3D) movement.

7. The medium of claim 6, wherein the instructions, if executed, cause the device to classify the movement as the device action, wherein the device action is to include one or more of a single click operation, a double click operation, a pinch operation and a cursor movement operation.

8. The medium of claim 5, wherein the instructions, if executed, cause the device to send a request to a device driver to initiate the device action, wherein the device driver is to include one or more of a mouse driver, a touchpad driver and a trackball driver.

9. The medium of claim 5, wherein the instructions, if executed, cause the device to:
synchronize the gaze information with the gesture information; and
log one or more of the gaze information and the gesture information.

10. An apparatus comprising:
a gaze module to identify a point of interest on a front facing display of a device based on gaze information associated with a user of the device, including:
identifying one or more eyes of the user,
determining a gaze location of the one or more eyes on the front facing display, and
determining a change in the gaze location, wherein the gaze information is to include the gaze location and the change in the gaze location;
a gesture module to identify a hand action based on gesture information associated with the user of the device, including:
identifying a hand of the user,
identifying one or more fingertips associated with the hand of the user, and
determining a movement of one or more of the hand and the one or more fingertips, wherein the gesture information is to include the movement and the movement is to be one or more of a one-dimensional (1D) movement, a two-dimensional (2D) movement and a three-dimensional (3D) movement;
an integration module to initiate a device action with respect to the front facing display based on the point of interest and the hand action, wherein the device action is to emulate a multi-modal touchscreen function with respect to the front facing display based on the first image and the second image, and wherein the multi-modal touchscreen function is to concurrently track and synchronize the gaze information and the gesture information;
a camera interface to receive image data from a front facing camera configuration of the device, wherein the gaze module is to identify the gaze information based on the image data and the gesture module is to identify the gesture information based on the image data,
wherein the camera interface is to:
receive a first image from a first camera of the camera configuration, and
receive a second image from a second camera of the camera configuration, wherein the image data is to include the first image and the second image, the gaze module is to determine the gaze information based on the first image, and the gesture module is to determine the gesture information based on the second image.

11. The apparatus of claim 10, wherein the integration module is to classify the movement as the device action, wherein the device action is to include one or more of a single click operation, a double click operation, a pinch operation and a cursor movement operation.

12. The apparatus of claim 10, wherein the integration module is to send a request to a device driver to initiate the device action, wherein the device driver is to include one or more of a mouse driver, a touchpad driver and a trackball driver.

13. The apparatus of claim 10, wherein the integration module is to:
synchronize the gaze information with the gesture information, and
log one or more of the gaze information and the gesture information.

14. A device comprising:
a front facing display; and
a multi-modal touch screen emulator including:
a gaze module to identify a point of interest on the front facing display based on gaze information associated with a user of the device, including:
identifying one or more eyes of the user,
determining a gaze location of the one or more eyes on the front facing display, and
determining a change in the gaze location, wherein the gaze information is to include the gaze location and the change in the gaze location,
a gesture module to identify a hand action based on gesture information associated with a user of the device, and
an integration module to initiate a device action with respect to the front facing display based on the point of interest and the hand action, wherein the device action is to emulate a multi-modal touchscreen function with respect to the front facing display based on the first image and the second image, and wherein the multi-modal touchscreen function is to concurrently track and synchronize the gaze information and the gesture information; and
a front facing camera configuration,
wherein the multi-modal touch screen emulator further includes a camera interface to receive image data from the front facing camera configuration, the gaze module is to identify the gaze information based on the image data, and the gesture module is to identify the gesture information based on the image data, and
wherein the camera configuration includes a first camera and a second camera, and wherein the camera interface is to,
receive a first image from the first camera of the camera configuration, and
receive a second image from the second camera of the camera configuration, wherein the image data is to include the first image and the second image, the gaze module is to determine the gaze information based on the first image, and the gesture module is to determine the gesture information based on the second image.

15. The device of claim 14, wherein the gesture module is to,
identify a hand of the user,
identify one or more fingertips associated with the hand of the user, and
determine a movement of one or more of the hand and the one or more fingertips, wherein the gesture information is to include the movement and the movement is to be one or more of a one-dimensional (1D) movement, a two-dimensional (2D) movement and a three-dimensional (3D) movement.

16. The device of claim 15, wherein the integration module is to classify the movement as the device action, wherein the device action is to include one or more of a single click operation, a double click operation, a pinch operation and a cursor movement operation.

17. The device of claim 14, wherein the integration module is to send a request to a device driver to initiate the device action, wherein the device driver is to include one or more of a mouse driver, a touchpad driver and a trackball driver.

18. The device of claim 14, wherein the integration module is to:
  synchronize the gaze information with the gesture information, and
  log one or more of the gaze information and the gesture information.

19. A method comprising:
  identifying one or more eyes of a user of a device having a front facing display;
  determining a gaze location of the one or more eyes on the front facing display;
  identifying a point of interest on the front facing display based on gaze information associated with the user of the device;
  determining a change in the gaze location, wherein the gaze information is to include the gaze location and the change in the gaze location;
  identifying a hand action based on gesture information associated with the user of the device;
  initiating a device action with respect to the front facing display based on the point of interest and the hand action, wherein the device action is to emulate a multi-modal touchscreen function with respect to the front facing display based on the first image and the second image, and wherein the multi-modal touchscreen function is to concurrently track and synchronize the gaze information and the gesture information;
  receiving image data from a front facing camera configuration of the device;
  identifying the gaze information and the gesture information based on the image data;
    receiving a first image from a first camera of the camera configuration; and
    receiving a second image from a second camera of the camera configuration, wherein the image data is to include the first image and the second image, the gaze information is to be determined based on the first image, and the gesture information is to be determined based on the second image.

20. The method of claim 19, further including:
  identifying a hand of the user;
  identifying one or more fingertips associated with the hand of the user; and
  determining a movement of one or more of the hand and the one or more fingertips, wherein the gesture information is to include the movement and the movement is to be one or more of a one-dimensional (1D) movement, a two-dimensional (2D) movement and a three-dimensional (3D) movement.

21. The method of claim 20, further including classifying the movement as the device action, wherein the device action is to include one or more of a single click operation, a double click operation, a pinch operation and a cursor movement operation.

22. The method of claim 19, further including sending a request to a device driver to initiate the device action, wherein the device driver is to include one or more of a mouse driver, a touchpad driver and a trackball driver.

23. The method of claim 19, further including:
  synchronizing the gaze information with the gesture information; and
  logging one or more of the gaze information and the gesture information.

* * * * *